(12) United States Patent
Rich et al.

(10) Patent No.: US 9,459,670 B2
(45) Date of Patent: Oct. 4, 2016

(54) ADAPTER FOR USE WITH A PORTABLE ELECTRONIC DEVICE

(75) Inventors: Zachary C. Rich, San Francisco, CA (US); Edward Siahaan, San Francisco, CA (US); Ian Colahan, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 13/607,553

(22) Filed: Sep. 7, 2012

(65) Prior Publication Data

US 2014/0075210 A1 Mar. 13, 2014

(51) Int. Cl.
*G06F 1/26* (2006.01)
*G06F 1/32* (2006.01)
*G06F 1/00* (2006.01)
*G06F 1/16* (2006.01)
*H01R 31/06* (2006.01)

(52) U.S. Cl.
CPC ............... *G06F 1/26* (2013.01); *G06F 1/1632* (2013.01); *H01R 31/065* (2013.01); *G06F 1/32* (2013.01); *G06F 2221/2153* (2013.01)

(58) Field of Classification Search
CPC .................................. G06F 1/26; G06F 1/32
USPC .......................... 713/300, 320; 439/928, 945
See application file for complete search history.

(56) References Cited

U.S. PATENT DOCUMENTS

| | | | |
|---|---|---|---|
| 5,387,110 A | 2/1995 | Kantner et al. | |
| 6,145,035 A | 11/2000 | Mai et al. | |
| 6,408,351 B1 | 6/2002 | Hamdi et al. | |
| 6,438,640 B1 * | 8/2002 | Miyamoto et al. | 710/303 |
| 6,934,561 B2 | 8/2005 | Burrus | |
| 7,005,889 B2 | 2/2006 | Sowden et al. | |
| 7,127,541 B2 | 10/2006 | Govindarajulu et al. | |
| 7,293,122 B1 | 11/2007 | Schubert et al. | |
| 7,305,254 B2 | 12/2007 | Findikli | |
| 7,305,511 B2 | 12/2007 | Barrett et al. | |
| 7,453,233 B2 * | 11/2008 | Fischer et al. | 320/111 |
| 7,591,657 B2 | 9/2009 | Teicher | |
| 7,762,470 B2 | 7/2010 | Finn et al. | |
| 7,840,729 B2 | 11/2010 | Inoue et al. | |
| 8,041,300 B2 | 10/2011 | Dorogusker et al. | |

(Continued)

FOREIGN PATENT DOCUMENTS

CN 202153598 U 2/2012
JP 02-078171 A 3/1990

(Continued)

OTHER PUBLICATIONS

English machine translation of the Japanese reference JP 2001084064 A.*

(Continued)

*Primary Examiner* — Phil Nguyen
(74) *Attorney, Agent, or Firm* — Kilpatrick Townsend & Stockton LLP (57) ABSTRACT

An adapter for enabling connection of a portable electronic device with an accessory includes two connectors, an identification device, a power control device, and power clamping circuitry. All of these components may be included in a single integrated housing. Another adapter may have a cable with two connectors connected to either end of the cable. One of the connectors may house the identification device and the power control device. Optionally, the adapter may also house the power clamp circuitry.

27 Claims, 7 Drawing Sheets

(56) References Cited

U.S. PATENT DOCUMENTS

| | | | |
|---|---|---|---|
| 8,126,734 B2 | 2/2012 | Dicks et al. | |
| 8,161,567 B2 | 4/2012 | Rubinstein et al. | |
| 8,208,853 B2 | 6/2012 | Lydon et al. | |
| 8,238,811 B2 | 8/2012 | Lydon | |
| 8,275,924 B2 | 9/2012 | Krueger et al. | |
| 8,280,465 B2 | 10/2012 | Dorogusker et al. | |
| 8,296,587 B2 | 10/2012 | Paniagua et al. | |
| 8,369,785 B2 | 2/2013 | Dorogusker et al. | |
| 8,417,980 B1 * | 4/2013 | Mimberg | 713/330 |
| 8,478,913 B2 | 7/2013 | Terlizzi et al. | |
| 8,515,580 B2 * | 8/2013 | Taylor et al. | 700/259 |
| 8,688,876 B1 | 4/2014 | Fritchman et al. | |
| 8,762,605 B2 | 6/2014 | Terlizzi et al. | |
| 8,886,849 B2 | 11/2014 | Golembeski et al. | |
| 2004/0103223 A1 | 5/2004 | Gabehart et al. | |
| 2005/0003831 A1 | 1/2005 | Anderson | |
| 2005/0077919 A1 | 4/2005 | Sowden et al. | |
| 2006/0056401 A1 | 3/2006 | Bohm et al. | |
| 2006/0156415 A1 | 7/2006 | Rubinstein et al. | |
| 2006/0220465 A1 * | 10/2006 | Kingsmore | G06F 1/26 307/64 |
| 2007/0214305 A1 | 9/2007 | Levy | |
| 2008/0140872 A1 | 6/2008 | Wright | |
| 2008/0150480 A1 * | 6/2008 | Navid | 320/113 |
| 2008/0319732 A1 * | 12/2008 | Farnsworth | 703/25 |
| 2009/0063744 A1 * | 3/2009 | Krueger et al. | 710/303 |
| 2009/0179768 A1 | 7/2009 | Sander et al. | |
| 2009/0189588 A1 * | 7/2009 | Tahata | 323/299 |
| 2009/0254746 A1 * | 10/2009 | Aihara et al. | 713/168 |
| 2009/0319064 A1 | 12/2009 | Chang | |
| 2010/0064065 A1 | 3/2010 | Depta et al. | |
| 2010/0075604 A1 | 3/2010 | Lydon et al. | |
| 2010/0077121 A1 * | 3/2010 | Lai et al. | 710/301 |
| 2010/0080563 A1 * | 4/2010 | DiFonzo et al. | 398/115 |
| 2010/0106983 A1 * | 4/2010 | Kasprzak | G06F 1/26 713/300 |
| 2010/0180063 A1 | 7/2010 | Ananny et al. | |
| 2010/0198286 A1 * | 8/2010 | Neumiller et al. | 607/5 |
| 2011/0055407 A1 | 3/2011 | Lydon et al. | |
| 2011/0061113 A1 * | 3/2011 | Rubinstein et al. | 726/34 |
| 2011/0078354 A1 | 3/2011 | Krueger et al. | |
| 2011/0167176 A1 | 7/2011 | Yew et al. | |
| 2011/0276734 A1 * | 11/2011 | Helfrich | 710/105 |
| 2011/0320655 A1 | 12/2011 | Dorogusker et al. | |
| 2012/0005395 A1 | 1/2012 | Lydon et al. | |
| 2012/0096207 A1 | 4/2012 | Chen | |
| 2012/0131230 A1 * | 5/2012 | Ady et al. | 710/8 |
| 2012/0252261 A1 | 10/2012 | Wu | |
| 2013/0080662 A1 | 3/2013 | Bourque | |
| 2013/0086397 A1 * | 4/2013 | Uchida | 713/300 |
| 2013/0138861 A1 | 5/2013 | Terlizzi et al. | |
| 2013/0238823 A1 | 9/2013 | Terlizzi et al. | |
| 2013/0304942 A1 | 11/2013 | Golembeski et al. | |
| 2014/0073188 A1 | 3/2014 | Fritchman et al. | |
| 2014/0075061 A1 | 3/2014 | Fritchman et al. | |
| 2015/0169476 A1 | 6/2015 | Golembeski et al. | |

FOREIGN PATENT DOCUMENTS

| | | |
|---|---|---|
| JP | 2006164706 A | 6/2006 |
| JP | 2008225939 A | 9/2008 |
| TW | 200308125 A | 12/2003 |
| TW | M297598 U | 9/2006 |
| WO | 02/08872 A1 | 1/2002 |
| WO | 2009/032797 A2 | 3/2009 |
| WO | 2009069969 A1 | 6/2009 |
| WO | 2010027694 A1 | 3/2010 |
| WO | 2011150403 A1 | 12/2011 |
| WO | 2012/112147 A1 | 8/2012 |

OTHER PUBLICATIONS

Notice of Allowance for U.S. Appl. No. 13/680,000, mailed Apr. 26, 2013, 31 pages.

"Reversible USB connector fits into ports either ways", Free Press Release, Jun. 25, 2010, 1 page.

"USB-Peripheral to Ethernet Adapter: User Guide" Mobility Electronics, 2005, 16 pages.

International Search Report and Written Opinion for PCT Application No. PCT/US2013/034665, mailed on Aug. 20, 2013, 9 pages.

International Preliminary Report on Patentability for International PCT Application No. PCT/US2013/034665, mailed Mar. 19, 2015, 5 pages.

USB Implementers Forum: "Universal Serial Bus Specification Revision 2.0—Chapters 1-5 and 9", Internet Citation, Apr. 27, 2000, XP002412161, Retrieved from the Internet: URL:http://www.usb.org.developers/docs/usb_20_05122006.zip, retrieved on Dec. 19, 2006, 147 pages.

* cited by examiner

ADAPTER FOR USE WITH A PORTABLE ELECTRONIC DEVICE

BACKGROUND

Portable electronic devices, such as portable media players, have become ubiquitous in today's society. As they have proliferated, so have the number and types of hardware accessories that are designed to interact with these portable media players. These accessories range in complexity, including, for example, simple speaker systems and complex automotive entertainment systems.

Accessories commonly communicate with a portable media player using a connector system. This connector system typically includes a plug connector at the accessory and a receptacle connector at the portable media player. A user fits the plug connector of the accessory into the receptacle connector of the portable media player thereby forming physical and electrical connections between the contacts of each connector that allow data and power to be exchanged between the devices.

Users may have multiple different portable media players. For various reasons, these media players may have different sized connectors. For example, the media players may be made by different manufacturers. Also, the media players may be manufactured by the same manufacturer, but a newer media player may have a more advanced, smaller sized connector receptacle than an older media player manufactured by the same company.

For these and other reasons, a user may encounter a situation where he/she has a portable media player but that media player is incompatible with certain accessories designed to operate with a different media player.

SUMMARY

Embodiments of the present invention are generally directed to electronic devices. Specifically, certain embodiments of the present invention provide an adapter that can be used to enable an accessory to communicate with a portable electronic device in situations where the accessory and the portable electronic device cannot be directly connected to each other.

When an accessory and a portable electronic device have incompatible connectors, an adapter of some sort may be needed to connect these devices together so that they can communicate with each other. An adapter according to an embodiment of the present invention includes two connectors, one of which is compatible with the accessory and the other is compatible with the portable electronic device. This allows the adapter to act as an intermediary device to relay signals to and from the accessory and the portable electronic device. Thus, the adapter enables the accessory to be "connected" to the portable electronic device.

An adapter according to an embodiment of the present invention includes a specialized connector at one end designed to mate with a corresponding connector of a portable electronic device. The adapter has a standard USB connector at the other end designed to mate with a corresponding USB connector of an accessory. In some embodiments, the adapter may include a cable that is disposed between the two connectors.

The following detailed description together with the accompanying drawings will provide a better understanding of the nature and advantages of the present invention.

DETAILED DESCRIPTION

Embodiments of the present invention relate to portable electronic devices and accessories in general. Specifically, certain embodiments of the present invention are related to adapters/connectors that allow an accessory to be connected to a host portable electronic device so that the accessory may communicate with the portable electronic device.

Some embodiments of the present invention provide a cable with a connector attached to either end of the cable. One of the connectors can be a standard Universal Serial Bus (USB) connector and the other connector is a specialized connector that is compatible with a corresponding connector of a portable electronic device. The cable may be connected to a power adapter in order to provide a charging voltage to the portable electronic device. In other embodiments, the cable may be used as a means for data transfer between the portable electronic device and a computer connected to the portable electronic device using the cable.

In still other embodiments, the adapter may be a dongle with two connectors and associated circuitry housed in a single integrated casing. In this embodiment, one connector may be a standard micro USB (µUSB) connector and the other connector may be the specialized connector described above.

The connector of an accessory may be incompatible with a connector of a host device in at least two ways. First, this incompatibility may be physical; i.e. the connector of the accessory may have a different shape/size/structure than the connector of the host device. In this instance, it may not be possible to physically mate the two connectors due to the difference in their shape, size, structure, or a combination of these attributes. For example, the number of contacts or pins of the connector of the accessory may be different than the number of contacts or pins of the connector of the host device. Second, this incompatibility may be electrical; signals received or provided at the connector of the accessory may be electrically incompatible with signals received or provided at the connector of the host device. In some instances the incompatibility may be both physical and electrical.

Where the incompatibility is physical, an embodiment of the present invention provides an adapter having (a) a first connector that is physically compatible with the connector of an accessory and (b) a second connector that is physically compatible with the connector of a host device. One or more electrical connections may be made between the contacts or pins of the first connector and the contacts or pins of the second connector on the adapter. Where the incompatibility is electrical, an embodiment of the present invention provides one or more circuits disposed in the adapter between the first connector and the second connector. The circuits can help with data transfer between the accessory and the host device in a proper format. Where the incompatibility is both physical and electrical, both these techniques may be employed by embodiments of the present invention.

Figure 1:
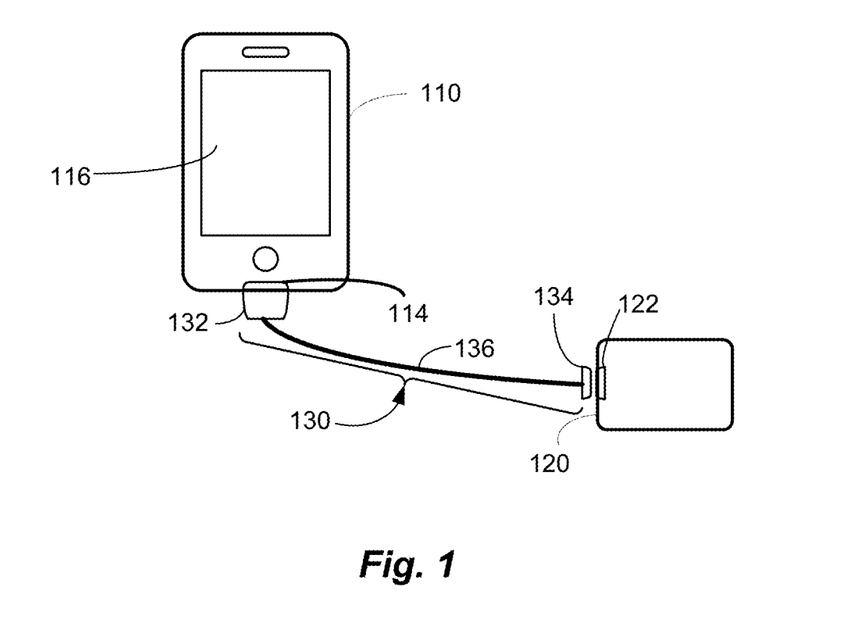
FIG. 1 illustrates a hardware accessory connected to a portable electronic device according to an embodiment of the present invention.

FIG. 1 illustrates a hardware accessory 120 that a user may want to connect to a portable electronic device 110, e.g., to extend the functionality of portable electronic device 110. In some embodiments, an adapter cable 130 may be used to connect accessory 120 with portable electronic device 110. In this example, portable electronic device 110 includes a receptacle connector 114 and a touchscreen 116. Portable electronic device 110 may be an iPod®, iPhone®, iPad® or a similar device. However, it is to be understood that the present invention is not limited to any particular type of portable electronic device.

Accessory 120 in this instance may be a power supply, an automotive radio, transmitter, audio/video receiver, storage device, clock radio, a personal computer or other device. Accessory 120 may include a connector 122 that includes a plurality of contacts (not shown) that carry electrical signals for one or more of data, audio, video, control functions, and power. In one embodiment, connector 122 may include between 4 and 30 contacts but the present invention is not limited to any particular contact count or configuration. In a particular embodiment, connector 122 may be a USB connector.

Various portable media players and other electronic devices may include receptacle connectors that are of different shape, size or pin configuration than receptacle connector 114, in which case these other receptacle connectors may not be compatible with or may be "incompatible" with connector 122. A connector on an accessory may not be compatible with a connector on a portable electronic device or portable media player because the connector on the accessory may be designed to mate with products made by a first manufacturer, while the portable media player is instead made by a second manufacturer. Also, a portable media player manufacturer may change the design of the connector on the portable media player for some products, such as newer generation products. For example, a smaller connector may be incorporated into newer generation products to enable the design of smaller portable media players. Also, a connector with a different pin-out may support new data communication protocols that could not be supported by an older legacy connector.

There are at least two types of incompatibility that may arise between a plug connector on an accessory and a receptacle connector on a host electronic device/portable electronic device, as described above. First, the receptacle connector may be physically incompatible with the plug connector, that is, they may have incompatible sizes and literally cannot be connected together in a mechanical sense.

As a second example of incompatible connectors, a plug connector on an accessory may not be compatible with a receptacle connector on a portable electronic device because one or more signals or power supply outputs on either the plug connector or receptacle connector are incompatible with inputs on the other end. This may occur at one or more levels of signaling. For example, a physical layer used to transmit and receive signals may be incompatible between the accessory and the portable electronic device. Specifically, signal voltages and other physical parameters may be different. Also, at the transport level, which specifies signal frequency and other parameters, may be different between the devices. The packet structure layer, which defines how messages and data are formatted and multi-packet logic levels, which define sequences of messages, may also vary among devices. In some embodiments, a pin on the plug connector may be assigned to a function (e.g., analog audio) and a corresponding pin on the receptacle connector may be assigned to a different function (e.g., digital audio).

Embodiments of the present invention provide an adapter that allows communication between a portable electronic device and an accessory in instances where a receptacle connector on the portable electronic device and a plug connector on an accessory are incompatible in one or both of these ways.

Returning to FIG. 1, adapter cable 130 may include two connectors 132 and 134 located at either end of a cable 136. Of the two connectors, connector 134 may be a USB connector that is designed to mate with connector 122 of accessory 120. Connector 132 of adapter cable 130 may be a specialized connector that is designed to be compatible with connector 114 of portable electronic device 110. Connector 132 is described in detail below.

In the instance where accessory 120 is a power supply unit, connector 134 of adapter cable 130 can be mated with connector 122 of accessory 120. The other connector 132 of adapter cable 130 can be mated with connector 114 of portable electronic device 110. Thereafter, accessory 120 can supply power to portable electronic device 110 via adapter cable 130. In the instance where accessory 120 is a personal computer (PC), a similar connection can enable the PC to exchange data/information with portable electronic device 110 over the USB data connection and optionally supply power to portable electronic device 110 also via the USB connection.

Figure 2A:
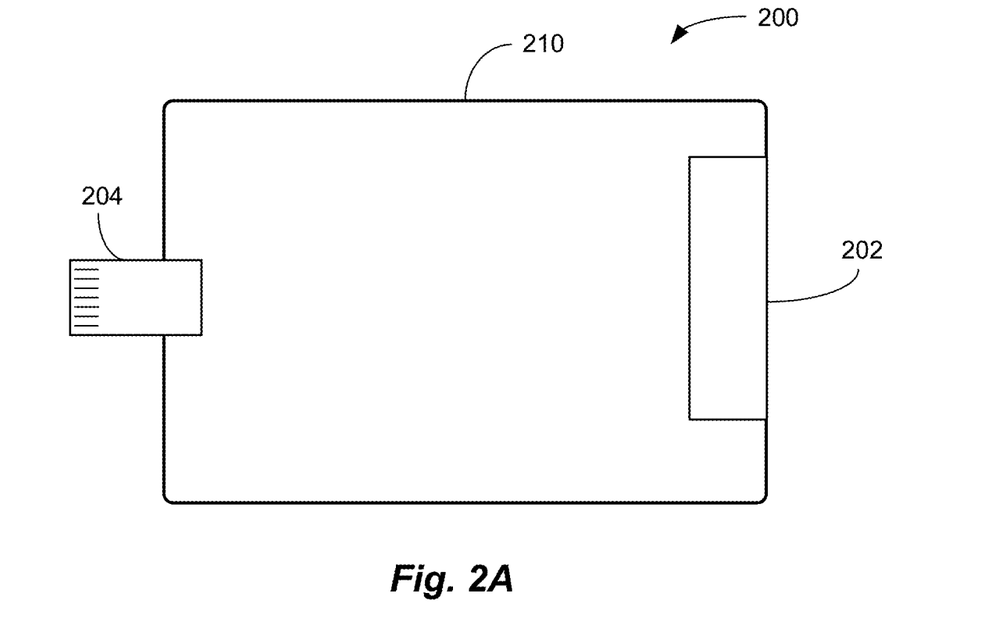
FIG. 2A illustrates an adapter according to another embodiment of the present invention.

FIG. 2A illustrates an adapter 200 according to another embodiment of the present invention. In a particular embodiment, adapter 200 includes a μUSB or USB connector 202 and a specialized plug connector 204. The μUSB/USB connector 202 is well known in the art and hence it is not described herein for sake of brevity. It is to be noted that μUSB connector 202 is only being used as an example to describe an embodiment. It will be clear to one skilled in the art that μUSB connector 202 can be replaced with any other type of connector such as but not limited to, USB, FireWire, 30-pin connector used in iPod®, iPhone®, and iPad® devices, RJ-45, or any other type of connector used in any electronic device.

Figure 2B:
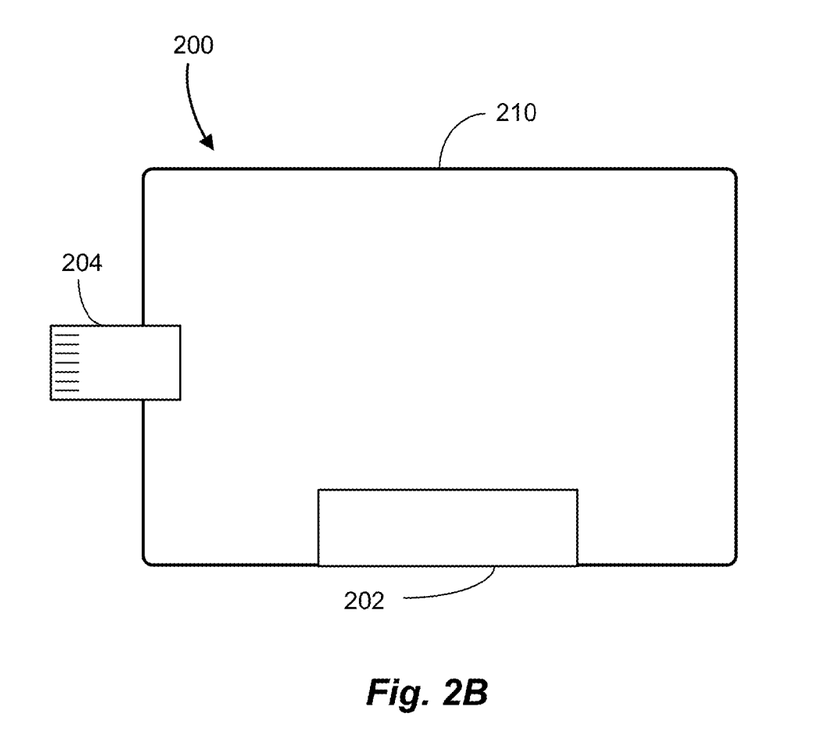
FIG. 2B illustrates another embodiment of the adapter of FIG. 2A.

Adapter 200 includes a housing 210 that encloses circuitry for operation of adapter 200. The details of the circuitry describe below. Connector 202 can be located at one end of housing 210 while connector 204 can be located at another end of the housing. In some embodiments, connectors 202 and 204 are located at opposite ends of housing 210 as illustrated in FIG. 2A; however this is not needed. Connectors 202 and 204 can also be located at two adjacent sides of housing 210, e.g., as illustrated in FIG. 2B. In an embodiment, connectors 202, 204, and the circuitry (not shown) are part of single housing 210.

Figure 3:
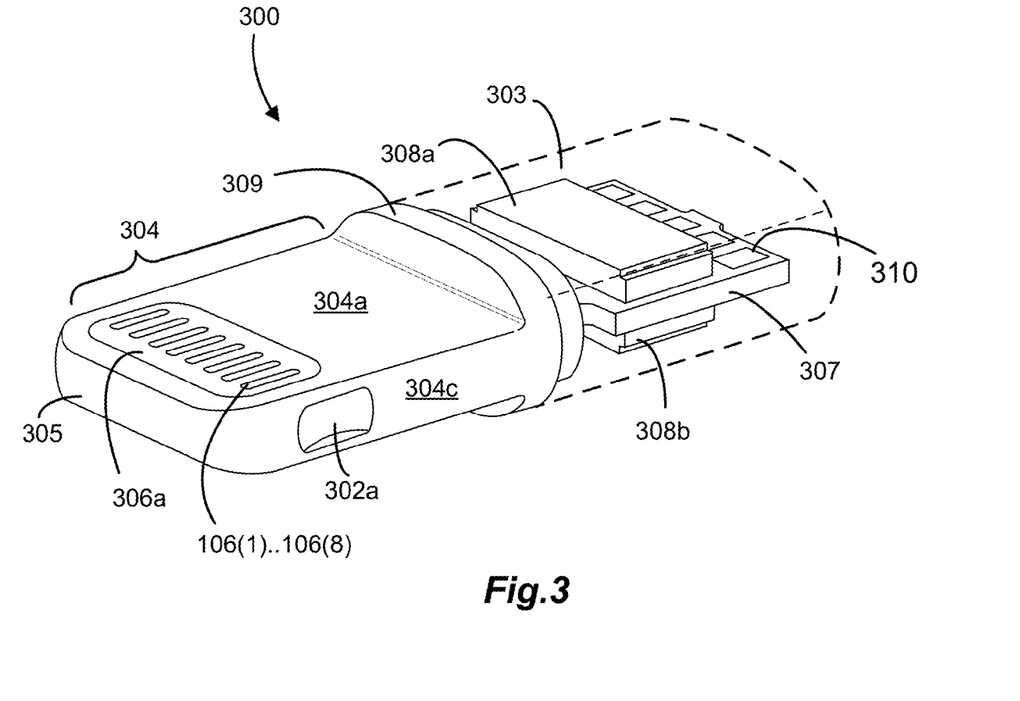
FIG. 3 illustrates a connector according to an embodiment of the present invention.

FIG. 3 illustrates a connector 300 according to an embodiment of the present invention. Connector 300 can be implemented as, e.g., connector 132 of FIG. 1 or connector 204 of FIG. 2A.

Connector 300 includes a body 303 and a tab portion 304 that extends longitudinally away from body 303 in a direction parallel to the length of the connector. In some embodiments, body 303 can be part of housing 210 of adapter 200 or can be a structural component of connector 300 that enables the connector to be attached to housing 210. Additionally, in some embodiments, adapter 200 may include a cable that extends from housing 210 to connector 300 providing more flexibility for the plug connector to be mated with a portable media device.

Tab 304 is sized to be inserted into a corresponding receptacle connector, such as receptacle connector 114 of portable media player 110 shown in FIG. 1, during a mating event and includes a first contact region 306a formed on a first major surface 304a and a second contact region 306b (not shown in FIG. 3) formed at a second major surface 304b (also not shown) opposite surface 304a. Surfaces 304a, 304b extend from a distal tip of the tab to a spine 309 that, when tab 304 is inserted into a corresponding receptacle connector, abuts a housing of the receptacle connector or portable electronic device the receptacle connector is incorporated in. Tab 304 also includes first and second opposing side surfaces 304c, 304d that extend between the first and second major surfaces 304a, 304b. In one particular embodiment, tab 304 is 6.6 mm wide, 1.5 mm thick and has an insertion depth (the distance from the tip of tab 304 to spine 309) of 7.9 mm.

The structure and shape of tab 304 is defined by a ground ring 305 that can be made from stainless steel or another hard conductive material. Connector 300 includes retention features 302a, 302b (not shown) formed as curved pockets in the sides of ground ring 305 that double as ground contacts. Body 303 is shown in FIG. 3 in transparent form (via dotted lines) so that certain components inside the body are visible. As shown, within body 303 is a printed circuit board (PCB) 307 that extends into ground ring 305 between contact regions 306a and 306b towards the distal tip of connector 300. One or more integrated circuits (ICs), such as Application Specific Integrated Circuit (ASIC) chips 308a and 308b, can be operatively coupled to PCB 307 to provide information regarding connector 300 and/or to perform specific functions, such as authentication, identification, contact configuration and current or power regulation. In a particular embodiment, chip 308a can be an identification device and chip 308b can be a power regulation/control device.

As an example, in one embodiment an ID module is embodied within an IC operatively coupled to the contacts of connector 300. The ID module can be programmed with identification and configuration information about the connector and/or its associated accessory/adapter that can be communicated to a host device during a mating event. As another example, an authentication module programmed to perform an authentication routine, for example a public key encryption routine, with circuitry on the host device can be embodied within an IC operatively coupled to connector 300. The ID module and authentication module can be embodied within the same IC or within different ICs. As still another example, in embodiments where adapter 200 enables an accessory to charge the host device connected to connector 300, a current regulator can be embodied within one of IC's 308a or 308b. The current regulator can be operatively coupled to contacts that are able to deliver power to charge a battery in the portable electronic device and regulate current delivered over those contacts to ensure a constant current regardless of input voltage and even when the input voltage varies in a transitory manner.

Bonding pads 310 can also be formed within body 303 near the end of PCB 307. Each bonding pad can be connected to a contact or contact pair within regions 306a and 306b. Wires (not shown) can then be soldered to the bonding pads to provide an electrical connection from the contacts to circuitry within an adapter. In some embodiments, however, bonding pads are not necessary and instead all electrical connections between the contacts and components of connector 300 and other circuitry within the adapter can be made through traces on a PCB that the circuitry is coupled to and/or by interconnects between multiple PCBs within the adapter.

As shown in FIG. 3 eight external contacts 106(1) . . . 106(8) are spaced apart along a single row in contact region 306a. A similar set of eight contacts are spaced apart along a single row in contact region 306b. The two rows of contacts are directly opposite each other and each contact in contact region 306a is electrically connected to a corresponding contact in contact region 306b on the opposite side of the connector. Contacts 106(1) . . . 106(8) can be used to carry a wide variety of signals including digital signals and analog signals as well as power and ground.

Figure 4:
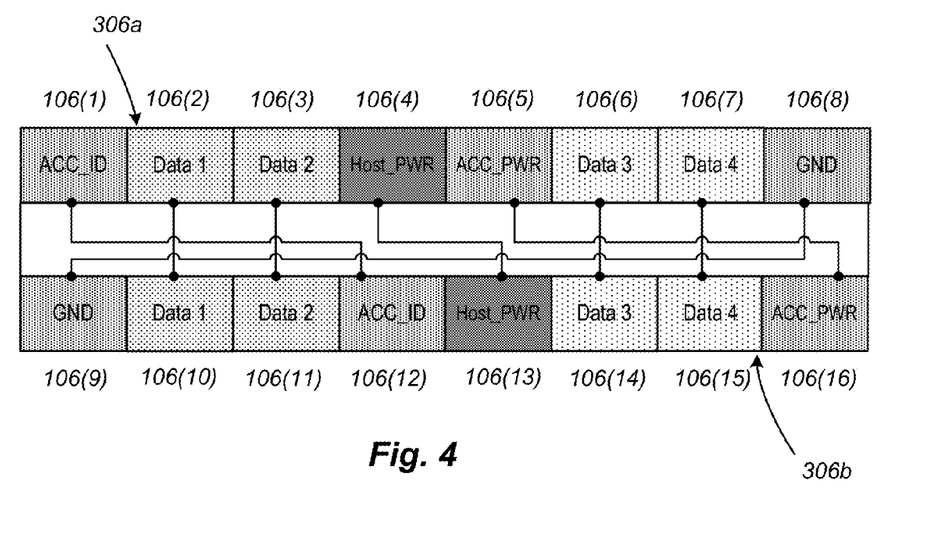
FIG. 4 depicts one particular implementation of a pin-out for connector of FIG. 3 according to an embodiment of the present invention.

FIG. 4 depicts one particular implementation of a pin-out for connector 300 according to one embodiment of the invention. In this embodiment, connector 300 is reversible. In other words, depending on how connector 300 is mated with a corresponding receptacle connector, either contacts 106(1)-106(8) or contacts 106(9)-106(15) may be in physical connection with the contacts in the receptacle connector. The pin-out shown in FIG. 4 includes two contacts 106(4), 106(13) that are electrically coupled together to provide power to a host device (e.g., the portable electronic device described herein) from the accessory; accessory ID contacts 106(1) or 106(12), accessory power contacts 106(5) or 106(16); and four pairs of data contacts 106(2) and 106(10), 106(3) and 106(11), 106(6) and 106(14), and 106(7) and 106(15). Host power contacts 106(4), 106(13) can be sized to handle any reasonable power requirement for a portable electronic device, and for example, can be designed to carry between 3-20 Volts from an accessory to charge a portable electronic device connected to connector 300. Host power contacts 106(4), 106(13) are positioned in a center region of contact regions 306a, 306b to improve signal integrity by keeping power as far away as possible from the sides of ground ring 305.

Accessory power contacts 106(5) or 106(16) can be used for an accessory power signal that provides power from the host to an accessory connected to the connector. The accessory power signal is typically a lower voltage signal than the host power signal provided over contacts 106(4) or 106(13), for example, 3.3 volts as compared to 5 volts or higher. Accessory ID contacts 106(1) or 106(12) provide a communication channel that enables the host device to authenticate the accessory and enables the accessory to communicate information to the host device about the accessory's capabilities as described in more detail below.

Data contact pairs 106(2) and 106(10), 106(3) and 106(11), 106(6) and 106(14), and 106(7) and 106(15) can be used to enable communication between the host and accessory using one or more of several different communication protocols. For example, data contacts 106(2) and 106(3) are positioned adjacent to and on one side of host power contact 106(4), while data contacts 106(14) and 106(15) are positioned adjacent to but on the other side of the other host power contact 106(13). The data contacts can be high speed data contacts that operate at rate that is two or three orders of magnitude faster than any signals sent over the accessory ID contact which makes the accessory ID signal look essentially like a DC signal to the high speed data lines.

Figure 5:
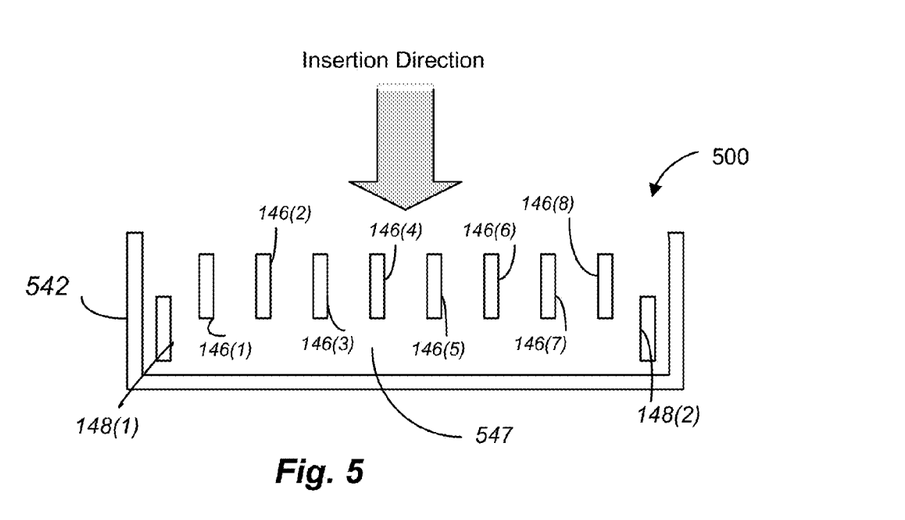
FIG. 5 depicts cross-sectional view of a receptacle connector that can couple with the connector of FIG. 3, according to an embodiment of the present invention.

FIG. 5 depicts cross-sectional view of one embodiment of a receptacle connector 500 that connector 300 can be coupled with. Receptacle connector 500 can, for example, be included in portable media player 110 as connector 114. As shown in FIG. 5, receptacle connector 500 includes eight contacts 146(1) . . . 146(8) that are spaced apart in a single row. The contacts are positioned within a cavity 547 that is defined by a housing 542. Receptacle connector 500 also includes side retention mechanisms (not shown) that engage with retention features 302a, 302b in connector 300 to secure connector 300 within cavity 547 once the connectors are mated. Receptacle connector 500 also includes two contacts 148(1) and 148(2) that are positioned slightly behind the row of signal contacts and can be used to detect when connector 300 is inserted within cavity 547 and detect when connector 300 exits cavity 547 when the connectors are disengaged from each other.

When tab 304 of connector 300 is fully inserted within cavity 547 of receptacle connector 500 during a mating event between the plug and receptacle connectors, each of contacts 106(1) . . . 106(8) from one of contact regions 106a or 106b are physically coupled to one of contacts 146(1) . . . 146(8) depending on the insertion orientation of connector 300 with respect to connector 500. Thus, contact 146(1) may be physically connected to either contact 106(1) or 106(16) depending on the insertion orientation; data contacts 146(2), 146(3) will connect with either data contacts 106(2), 106(3) or with data contacts 106(14), 106(15) depending on the insertion orientation, etc.

Figure 6:
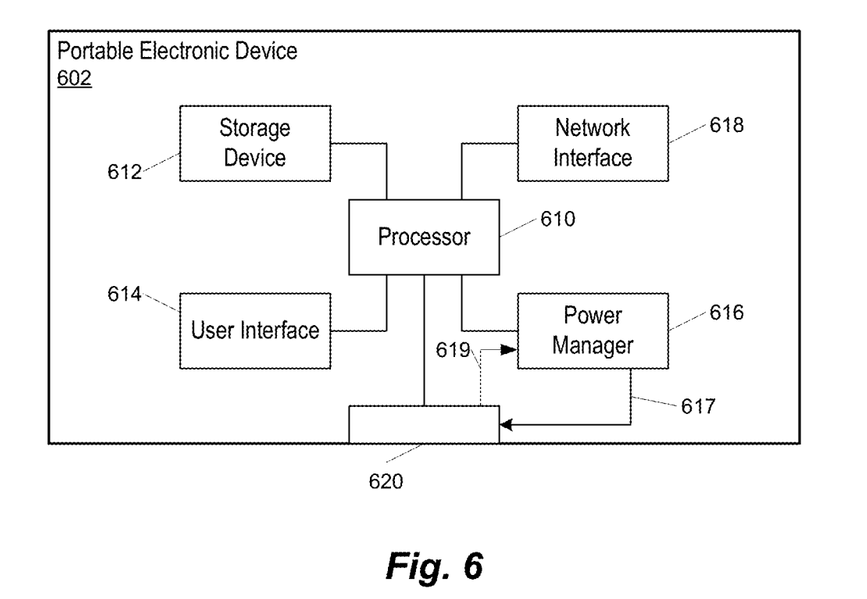
FIG. 6 is a functional block diagram of a portable electronic device according to an embodiment of the present invention.

FIG. 6 is a functional block diagram of a portable electronic device according to an embodiment of the present invention. Portable electronic device 602 (e.g., implementing portable electronic device 130 of FIG. 1) can provide computing, communication and/or media playback capability. Portable electronic device 602 can include a processor 610, storage device 612, user interface 614, power manager 616, network interface 618, and accessory input/output (I/O) interface 620. Portable electronic device 602 can also include other components (not explicitly shown) to provide various enhanced capabilities.

Storage device 612 can be implemented, e.g., using disk, flash memory, or any other non-transitory or non-volatile storage medium. In some embodiments, storage device 612 can store media assets such as audio, video, still images, or the like, that can be played by portable electronic device 602. Storage device 612 can also store other information such as a user's contacts (names, addresses, phone numbers, etc.); scheduled appointments and events; notes; and/or other personal information. In some embodiments, storage device 612 can store one or more application programs to be executed by processor 610 (e.g., video game programs, personal information management programs, media playback programs, etc.).

User interface 614 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 614 to invoke the functionality of portable electronic device 602 and can view and/or hear output from portable electronic device 602 via output devices of user interface 614.

Processor 610, which can be implemented as one or more integrated circuits (e.g., a conventional microprocessor or microcontroller), can control the operation of portable electronic device 602. In some embodiments, single-core processors, multi-core processors, and/or multi-processor systems may be implemented. In various embodiments, processor 610 can execute a variety of programs in response to program code and can maintain multiple concurrently executing programs or processes. At any given time, some or all of the program code to be executed can be resident in processor 610 and/or in storage media such as storage device 612. Processor 610 can also operate other programs to control other functions of portable electronic device 602. In some embodiments, processor 610 implements a protocol daemon and other programs to manage communication with one or more connected accessories (e.g., adapter 150 and accessory 120); examples are described below. In other embodiments, processor 610 can determine the type of accessory connected to the adapter and based on that information instruct the adapter to enable a specific mode of the adapter.

Power manager 616 provides power management capability for portable electronic device 602. For example, power manager 616 can deliver power from a battery (not explicitly shown) to accessory I/O interface 320 via line 617 and to other components of portable electronic device 602 (power connections not shown). Power manager 616 can also receive power via accessory I/O interface 620 and line 619 and deliver received power to various components of portable electronic device 602; power received from an accessory can also be delivered to the battery, thereby allowing the battery to be recharged via accessory I/O interface 620. In some embodiments, power manager 616 can be implemented using programmable or controllable circuits operating in response to control signals generated by program code executing on processor 610 or as a separate microprocessor or microcontroller.

In some embodiments, power manager 616 is responsive to signals from a sensor (not explicitly shown) in accessory I/O interface 620. The sensor can generate a signal indicative of the type of accessory connected, and power manager 616 can use this information to determine, e.g., whether to distribute power from the battery or power received from accessory I/O interface 620. Power manager 616 can also provide other power management capabilities, such as regulating power consumption of other components of portable electronic device 602 based on the source and amount of available power, monitoring stored power in the battery and generating user alerts if the stored power drops below a minimum level, and so on.

Network interface 618 can provide voice and/or data communication capability for portable electronic device 602. In some embodiments network interface 618 can include radio frequency (RF) transceiver components for accessing wireless voice and/or data networks (e.g., using cellular telephone technology, advanced data network technology such as 3G, EDGE, or 4G (e.g., LTE network), WiFi (IEEE 802.11 family standards), or other mobile communication technologies, or any combination thereof), GPS receiver components, and/or other components. In some embodiments network interface 618 can provide wired network connectivity (e.g., Ethernet) in addition to or instead of a wireless interface. Network interface 618 can be implemented using a combination of hardware (e.g., antennas, modulators/demodulators, encoders/decoders, and other analog and/or digital signal processing circuits) and software components.

Accessory I/O interface 620 can allow portable electronic device 602 to communicate with various accessories. For example, accessory I/O interface 620 can support connections to an adapter, a computer, an external speaker dock or media playback station, a digital camera, a radio tuner (e.g., FM, AM and/or satellite), an in-vehicle entertainment system, an external video device, card reader, disc reader, or the like. In accordance with some embodiments of the invention, accessory I/O interface 620 can support connection to multiple accessories in a daisy chain configuration, allowing portable electronic device 602 to manage concurrent communication with multiple accessories.

In some embodiments, accessory I/O interface 620 can include a receptacle connector, such as a connector 500 as illustrated in FIG. 5, as well as supporting circuitry for the connector. The connector can provide connections for power and ground as well as for various wired communication interfaces such as Universal Serial Bus (USB), FireWire (IEEE 1394 standard), and/or universal asynchronous receiver/transmitter (UART). The connector can also provide connections for audio and/or video signals, which may be transmitted to or from portable electronic device 602 in analog and/or digital formats. Thus, accessory I/O interface 620 can support multiple communication channels, and a given accessory can use any or all of these channels.

Figure 7:
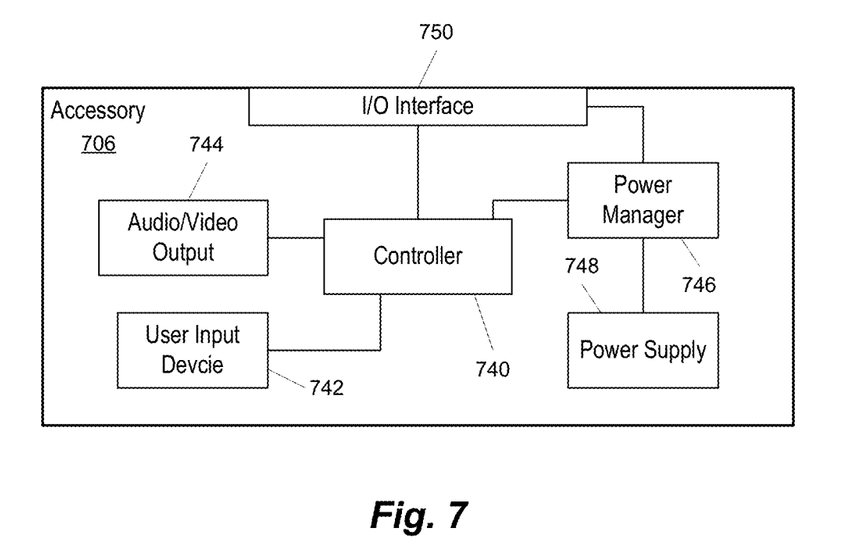
FIG. 7 is a functional block diagram of an accessory according to an embodiment of the present invention.

FIG. 7 is a functional block diagram of an accessory according to an embodiment of the present invention. Accessory 706 (e.g., implementing accessory 120 of FIG. 2) can include controller 740, user input device 742, audio/video output device 744, power manager 746, power supply 748 and I/O interface 750. Accessory 706 is representative of a broad range of accessories that can have their own functionality and be connected to portable electronic device 302 via an intermediary such as adapter 150. Accessories can vary widely in capability, complexity, and form factor. Various accessories may include components not shown in FIG. 7, including but not limited to storage devices (disk, flash memory, etc.) with fixed or removable storage media; camera components such as lenses, image sensors, and controls for same (e.g., aperture, zoom, exposure time, frame rate, etc.); microphones for recording audio (either alone or in connection with video recording); and so on.

Controller 740 can include, e.g., a microprocessor or microcontroller executing program code to perform various operations associated with accessory 706. For example, where accessory 706 incorporates a sound and/or video system, program code executed by controller 740 can include programs for digital audio decoding, analog or digital audio processing, and the like.

User input device 742 may include user-operable controls such as a touch pad, touch screen, scroll wheel, click wheel, dial, button, switch, keyboard, keypad, microphone, or the like. A user can operate the various input controls of user interface 734 to invoke functionality of accessory 706, and such functionality may include exchanging control signals, data, or other communications with portable electronic device 602 either directly or via an intermediary such as adapter 150. In some embodiments, the communications sent and received by accessory 706 can be independent of whether an intermediary is present.

In some embodiments, accessory 706 can also provide output devices such as audio/video output device 744. In some embodiments, audio/video output device 744 can include speakers and/or connection ports for connecting external speakers or headphones; a video screen and/or a connection port for connecting an external video screen, indicator lights, or the like, together with supporting electronics (e.g., digital-to-analog or analog-to-digital converters, signal processors or the like). These components can be coupled to receive audio and/or video signals via I/O interface 750. Such components can allow the user to view and/or hear output from accessory 706.

Power manager 746 can provide power management capability for accessory 706. For example, power manager 746 can be configured to receive power from a power supply 748. In some embodiments, power supply 748 can include a connection to an external power source (e.g., the standard electric grid); for example, power supply 748 can include an AC-DC converter that can be internal or external to accessory 706. In other embodiments, power supply 748 can include a battery or other energy storage device. Power manager 746 can deliver power from power supply 748 to various components of accessory 706. In addition, in some embodiments, power manager 746 can deliver power to upstream accessories, e.g., adapter 150, via I/O interface 750.

I/O interface 750 can allow accessory 706 to communicate with portable electronic device 602 either directly or through an intermediary such as adapter 150. In some embodiments, I/O interface 750 can include a connector that can mate directly with a connector included in adapter 150, such as a 30-pin connector similar to the one found on various iPod® products. Such a connector can be used to supply power to portable electronic device 602 or receive power from portable electronic device 602, to receive audio and/or video signals in analog and/or digital formats, and to communicate information via various interfaces such as USB, UART, and/or FireWire. All these signals can be communicated via an intermediary such as adapter 200 or 130.

It will be appreciated that the system configurations and components described herein are illustrative and that variations and modifications are possible. The portable electronic device and/or the accessory may have other capabilities not specifically described herein (e.g., mobile phone, global positioning system (GPS), broadband data communication, Internet connectivity, etc.).

Figure 8:
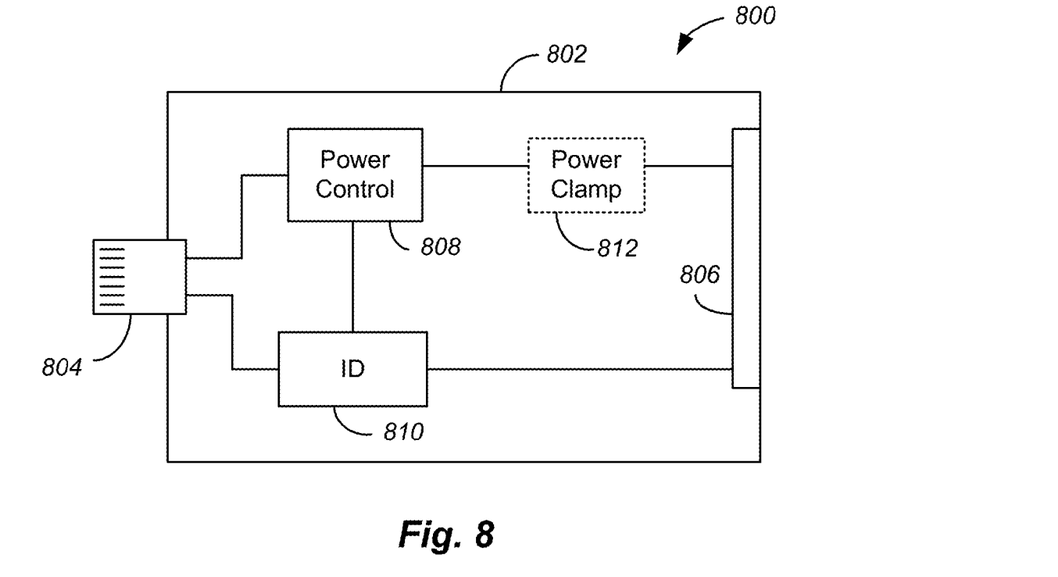
FIG. 8 is a high-level block diagram of an adapter according to an embodiment of the present invention.

FIG. 8 is a high-level block diagram of an adapter 800 according to an embodiment of the present invention. Adapter 800 can be implemented, e.g., as adapter 200 of FIG. 2. Adapter 800 includes a housing 802, a first connector 804, a second connector 806, a power control device 808, an identification device 810, and optional power clamping circuitry 812. In an embodiment, all of these components are included in the single housing 802.

Housing 802 can be made of plastic, metal, or any other suitable material. Although housing 802 is shown as rectangular in shape, it is to be understood that any other suitable shape may be used. Connector 804 can be same as connector 300 described above and be designed to mate with a corresponding connector of a portable electronic device, e.g., connector 114 of portable electronic device 110 of FIG. 1. Connector 806 can be configured to mate with a connector of an accessory (not shown). For example, connector 806 can be any of the currently available connectors used for connecting electronic devices (examples are described above). In a particular embodiment, connector 806 can be a μUSB connector.

Power control device 808 can be implemented as a single integrated circuit and may be designed to control a power path between an accessory connected to connector 806 and a portable electronic device connected to connector 804. Power control device 808 may include a first high resistance path and a second low resistance path. In some embodiments, the high resistance path may be connected in parallel to the low resistance path. Based on a signal from identification device 810, power control device 808 may enable one of the two paths in order to control the power path between the accessory and the portable electronic device. In some embodiments, the high resistance path may include a resistor having a fixed value. This enables accurate determination of a current passing through the high resistance path for a given voltage input to power control device 808. In some embodiments, the low resistance path includes a switch (e.g., a transistor) that can be turned 'on' or 'off' as needed. When the transistor is in the 'on' condition, substantially all the voltage at the input of power control device 808 is available at the output of power control device 808.

Identification device 810 can be implemented as a single integrated circuit. In some embodiments, identification device 810 and power control device 808 can be part of a single integrated circuit. Identification device 810 includes identification and authentication information for adapter 800 and/or an accessory connected to adapter 800. Identification device 810 can communicate with a portable electronic device connected to connector 804 to exchange identification and authentication information with the portable electronic device. In some embodiments, identification information can include an identifier associated with the adapter such as a serial number, model number, manufacturer ID, etc.

Optional power clamping circuit 812 may ensure that any excess voltage at the input of power control circuitry 808 is held to maximum predetermined voltage so as to prevent damage to power control device 808. For example, power control device 808 may be designed to accept 5 V maximum as input. Consider that due to some malfunction in an accessory connected to connector 806, 20 V are presented to the input of power control device 808. In this instance, power clamping circuitry dissipates the excess voltage and presents no more than 5 V at the input of power control device 808. Without the presence of power control circuitry, the 20 V could pass to power control device 808 thereby damaging power control device 808.

In order to explain the operation of adapter 800 consider that an accessory connected to connector 806 is a power supply and the portable electronic device connected to connector 804 is a mobile phone. After the connection of the accessory and the portable electronic device to adapter 800, identification device 810 communicates with the portable electronic device to provide identification and authentication information about the adapter and/or the accessory to the portable electronic device. Concurrently or shortly thereafter, identification device 810 sends a signal to power control device 808 to enable the low resistance path. By default, the high resistance path is enabled by power control device 808 prior to receiving the signal from identification device 810. Based on the signal received from the identification device, power control device 808 enables the low resistance path thereby enabling a power path between the accessory (power supply in this example) and the portable electronic device (mobile phone in this example). The accessory can now supply power to the portable electronic device via the adapter. The same process may be used when the cable adapter 130 of FIG. 1 is used instead of adapter 800. In some embodiments, adapter 800 is first authenticated by the portable electronic device prior to adapter enabling the power path.

It will be appreciated that the system configurations and components for adapter 800 described herein are illustrative and that variations and modifications are possible. The adapter may have other components not specifically described herein. Further, while the adapter is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Figure 9:
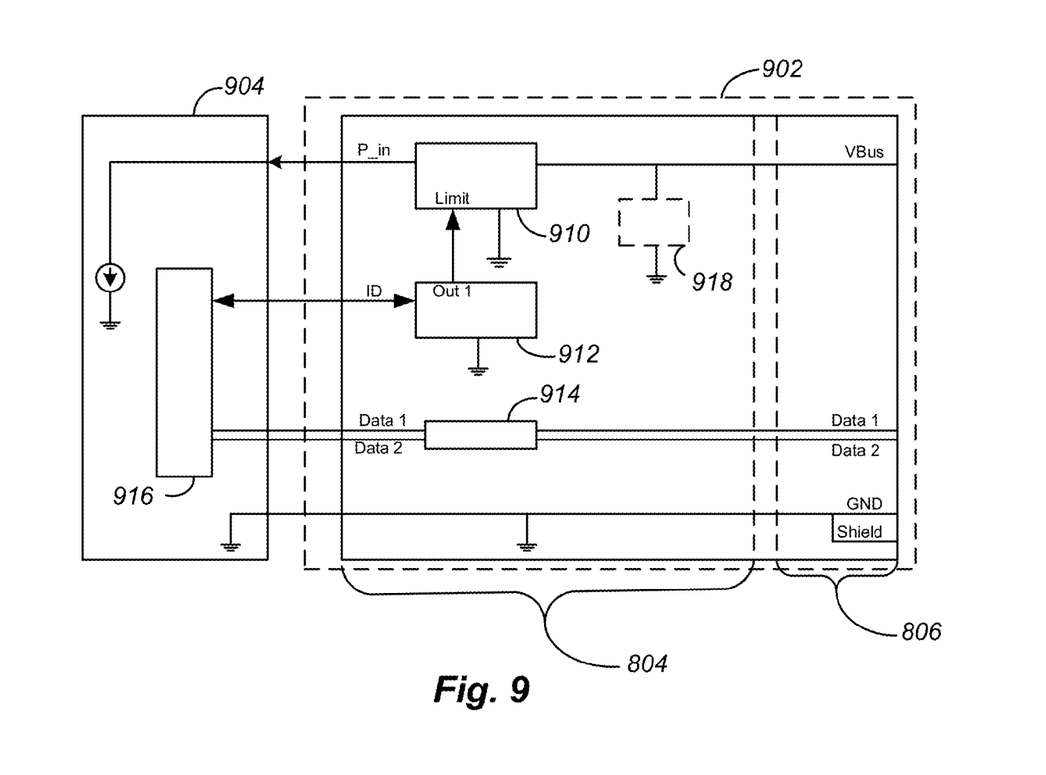
FIG. 9 is a functional block diagram of an adapter according to an embodiment of the present invention.

FIG. 9 is a functional block diagram of an adapter 900 according to an embodiment of the present invention. Adapter 900 can be implemented as, e.g., adapter 200 of FIG. 2B or adapter 800 of FIG. 8.

Adapter 900 can include a housing 902 that houses connectors 804 and 806 along with other circuitry. In some embodiments, connector 906 can be a specialized connector, e.g., connector 300, and connector 806 can be a μUSB connector or any other known electrical connector. For ease of explanation, in FIG. 9, connector 806 is illustrated as a μUSB connector with a power contact, a pair of data contacts Data 1 and Data 2, and a ground contact. One skilled in the art will understand that connector 806 can have more or less contacts than the ones shown in FIG. 9.

Connector 804 can be mated with a complimentary connector of a host device 904. Connector 804 can include power control circuitry 910, identification (and optionally authentication) circuitry 912, an optional power clamping circuit 918, and an electrostatic discharge (ESD) circuit 914. Power control circuitry 910 can be similar to power control device 808 of FIG. 8 and perform a similar function. Identification circuitry 912 can be similar to identification device 810 of FIG. 8 and perform a similar function. Power clamp circuit 918 can be similar to the power clamp circuit 812 of FIG. 8 and perform a similar function.

ESD protection circuit 914 can be disposed in-line with the data lines to ensure that data transmission if free from corruption and disruption. ESD protection circuit 914 can be implemented using well-known techniques in the art and explanation of ESD protection circuit 914 is omitted here for brevity.

In a particular embodiment, an accessory, e.g., a personal computer, can be connected to connector 806 and a portable electronic device 904, e.g., iPhone®, can be connected to connector 804. The accessory can communicate with portable electronic device 904 via adapter 900 to exchange data over the two data contacts. In some embodiments, portable electronic device 904 may include additional circuitry 916 that can receive information from the accessory and perform appropriate processing on or using that information. In an embodiment, adapter 900 may authenticate itself and/or the accessory with portable electronic device 904 prior to any exchange of information or power between the accessory and portable electronic device 904.

In some embodiments, the accessory may also supply charging power to portable electronic device 904 via adapter 900. In this instance once the accessory and the portable electronic device are connected to adapter 900, the adapter may send ID information and authentication information to portable electronic device 904. Once the ID information is validated and adapter 900 is authenticated, identification circuitry 912 sends a signal to power control circuitry 910 to enable a power path between the accessory and portable electronic device 904. Based on the signal, power control circuitry enables the power path and allows power to flow from the accessory to portable electronic device 904, e.g., via the P_in line as illustrated in FIG. 9.

In the instance where the adapter is not characterized by a single integrated housing as described above, e.g., such as cable adapter 130 above, the power control device, the identification device, and optionally the power clamp circuitry may be included within the connector, e.g., connector 132 of FIG. 1.

Figure 10:
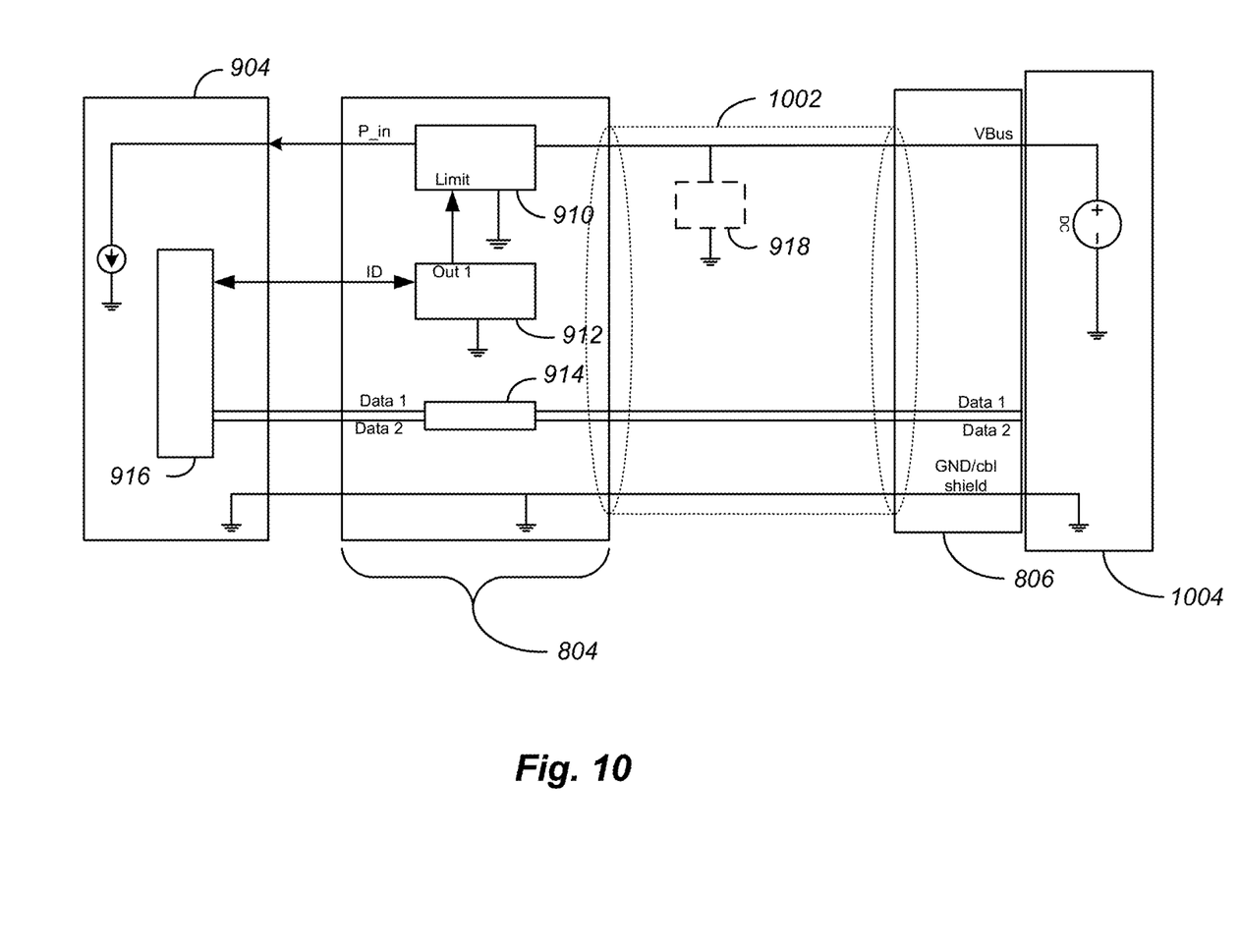
FIG. 10 is a functional block diagram of an adapter according to another embodiment of the present invention.

FIG. 10 illustrates a functional block diagram of an adapter 1000 according to another embodiment of the present invention. Adapter 1000 can be implemented as, e.g., adapter cable 130 of FIG. 1.

Adapter 1000 includes a cable 1002 that has connector 804 attached to one end and connector 806 attached to the other end. Connectors 804 and 806 are similar to ones described in connection with FIG. 9 above. In this embodiment, connector 804 can be coupled to a complimentary connector on portable electronic device 904 and connector 806 can be coupled to an accessory 1004. In FIG. 10, accessory 1004 is illustrated as a power supply, but could be any other accessory. In this embodiment, connector 804 houses the power control circuit 910, identification circuit 912, and ESD protection circuit 914. Power claim circuit 918 may be included in cable 1002 or in connector 804. In some embodiments, cable 1002 can be between 1 meter and 2 meters long.

Figure 11:
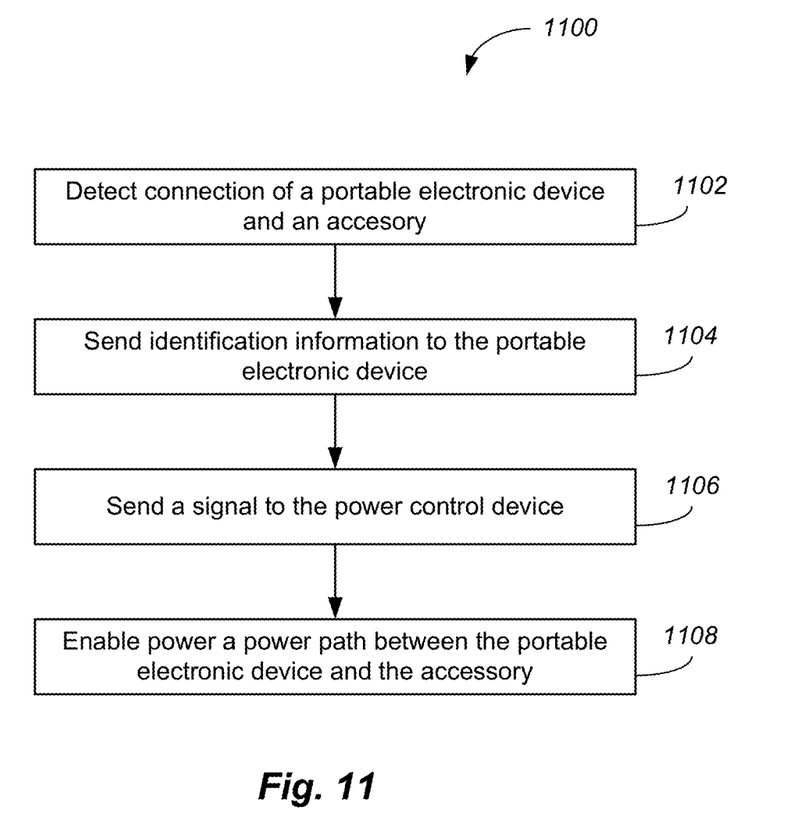
FIG. 11 is a flow diagram of a process for operating an adapter according to an embodiment of the present invention.

FIG. 11 is a flow diagram of a process 1100 for using an adapter according to an embodiment of the present invention. Process 1100 can be performed by any of adapters 900 or 1000.

At block 1102, the adapter can detect connection of a portable electronic device to a first connector of the adapter and an accessory to a second connector of the adapter. Upon connection of the portable electronic device and the accessory to the adapter, the adapter can provide identification information to the portable electronic device using, e.g., the identification device disposed in the adapter, at block 1104. The adapter may also send authentication information to the portable electronic device. Thereafter, the identification device within the adapter may send a signal to the power control device within the adapter at block 1106. Initially, the adapter is configured to present a limited current, e.g., about 15 mA, at the power input connection of the portable electronic device (e.g., via the P_in contact illustrated in FIG. 9). As described above, the power input (i.e., P_in) connection is used to provide power from the accessory to the portable electronic device via the adapter. Thus, effectively a power path between the accessory and the portable electronic device is "disabled" as the portable electronic device cannot obtain the needed power from the accessory. The signal from the identification device may instruct the power control device to enable the power path between the accessory and the portable electronic device at block 1108. The power control device can then enable the power path between the accessory thus enabling the portable electronic device to receive the needed current at the operating voltage (e.g., about 5 V) to enable the operation of the portable electronic device and/or to charge a battery of the portable electronic device.

It should be appreciated that the specific steps illustrated in FIG. 11 provides a particular method of operating an adapter according to an embodiment of the present invention. Other sequences of steps may also be performed according to alternative embodiments. For example, alternative embodiments of the present invention may perform the steps outlined above in a different order. In some embodiments, the accessory may ensure that it has been authenticated by the host device prior to enabling the bias on the data contacts. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. An adapter for enabling communication between a first device and a second device, the adapter comprising:
   a housing including a first side and a second side;
   a first connector disposed at the first side and configured to be mated with a first device connector associated with the first device;
   a second connector disposed at the second side and configured to be mated with a second device connector associated with the second device;
   a first power path between the first and second connector and a second power path between the first connector and the second connector in parallel with the first power path, the second power path having a lower resistance than the first power path;

an electrostatic discharge (ESD) protection circuit disposed in-line with data lines between the first and second connectors, the ESD protection circuit configured to reduce corruption and disruption of data transmission over the data lines;

an identification device coupled to the first connector and disposed in the housing, the identification device storing identification information for the adapter and configured to communicate the identification information to the first device; and a power control device disposed in the housing and coupled to the identification device, the first connector, and the second connector, wherein the power control device is configured to enable the first power path between the first connector and the second connector by default and enable the second power path between the first connector and the second connector after the identification information is validated.

2. The adapter of claim 1 wherein the first connector comprises between 4 and 16 contacts arranged in opposing pairs and wherein a first contact from a pair of contacts is disposed on a top surface of a printed circuit board (PCB) and a second contact from the pair of contacts is disposed on a bottom surface of the PCB directly below the first contact.

3. The adapter of claim 1 wherein the first connector comprises:
a tab portion that extends from the housing to a predetermined distance;
a first plurality of contacts arranged on an upper surface of the tab;
a second plurality of contacts arranged on a bottom surface of the tab;
wherein each contact in the first plurality of contacts is located directly above a corresponding contact in the second plurality of contacts.

4. The adapter of claim 3 wherein the first plurality of contacts and the second plurality of contacts are exposed to the environment.

5. The adapter of claim 1 wherein the second connector is a universal serial bus (USB) connector.

6. The adapter of claim 1 wherein the identification device is implemented as a single integrated circuit (IC) chip.

7. The adapter of claim 1 wherein the power control device is implemented as a single integrated circuit (IC) chip.

8. The adapter of claim 1 further comprising power clamping circuitry coupled to the power control device, the power clamping circuitry configured to present a voltage at the input of the power control device that does not exceed a predetermined value.

9. An adapter for enabling communication between a first device and a second device, the adapter comprising:
a cable having a first end and a second end;
a first connector attached to the first end of the cable and configured to be mated with a first device connector associated with the first device; and
a second connector attached to the second end of the cable and configured to be mated with a second device connector associated with the second device,
first and second parallel power paths between the first connector and the second connector, the second power path having a lower resistance than the first power path;
wherein the first connector comprises:
an electrostatic discharge (ESD) protection circuit disposed in-line with data lines between the first and second connectors, the ESD protection circuit configured to reduce corruption and disruption of data transmission over the data lines;

an identification device configured to store identification information for the adapter and configured to communicate the identification information to device; and a power control device coupled to the identification device, the first connector and the second connector, wherein the power control device is configured to enable the first power path between the first connector and the second connector by default and to enable the second power path between the second connector and the first connector after the identification information is validated.

10. The adapter of claim 9 further comprising a power clamp circuit coupled to the power control device and configured to ensure that a voltage at the input of the power control device does not exceed a predetermined value.

11. The adapter of claim 9 wherein the identification device is implemented as single integrated circuit (IC) chip.

12. The adapter of claim 9 wherein the power control device is implemented as single integrated circuit (IC) chip.

13. The adapter of claim 9 wherein the identification device and the power control device are together implemented as single integrated circuit (IC) chip.

14. The adapter of claim 9 wherein the second connector is a micro universal serial bus (μUSB) connector.

15. The adapter of claim 9 wherein the power control circuitry comprises a first power path and a second power path and wherein a first resistance of the first power path is higher than a second resistance of the second power path.

16. The adapter of claim 9 wherein the first power path has a first resistance sufficiently high that the first device cannot obtain power from the second device over the first power path, and the second power path, when enabled, enables the first device to obtain power from the second device.

17. A method for electrically connecting a first electronic device to a second device using an adapter that includes a first connector, a second connector, an identification device, first and second parallel power paths between the first connector and the second connector, the second power path having a lower resistance than the first power path, and a power control device, the method comprising:

upon connection of a first electronic device to the first connector and connection of a second electronic device to the second connector, enabling the first power path and sending, by the identification device, identification information associated with the adapter to the portable electronic device, the identification information being stored in the identification device;

sending, by the identification device to the power control device, a signal to enable the second power path between the accessory and the portable electronic device; and enabling, by the power control device, the second power path between the accessory and the portable electronic device; and reducing corruption and disruption of data transmission over data lines between the first and second connectors with an electrostatic discharge (ESD) protection circuit disposed in-line with data lines between the first and second connectors.

18. The method of claim 17 further comprising:
sending, by the identification device, authentication information to the portable electronic device, the authentication information being stored in the identification device.

19. The method of claim 17 wherein the first connector comprises between 4 and 16 contacts arranged in opposing pairs and wherein a first contact from a pair of contacts is disposed on a top surface of a printed circuit board (PCB) and a second contact from the pair of contacts is disposed on a bottom surface of the PCB directly below the first contact.

20. The method of claim 17 wherein the power control device includes a first power path that has a first resistance and a second power path that has a second resistance higher than the first resistance and wherein enabling the power path comprises enabling the first power path.

21. The method of claim 20 wherein the first power path has a resistance sufficiently high that the portable electronic device cannot obtain power from the accessory over the first power path, and wherein the second power path, when enabled, enables the portable electronic device to obtain power from the accessory.

22. The adapter of claim 1 wherein the first power path comprises a resistor having a fixed value and the second power path includes a transistor.

23. The adapter of claim 9 wherein the first power path comprises a resistor having a fixed value and the second power path includes a transistor.

24. The method of claim 17 wherein the first power path comprises a resistor having a fixed value and the second power path includes a transistor.

25. The adapter of claim 1 wherein the power control device is configured to receive DC power from the second device over the second connector and provide DC power to the first device over the first connector.

26. The adapter of claim 9 wherein the power control device is configured to receive DC power from the second device over the second connector and provide DC power to the first device over the first connector.

27. The method of claim 17 wherein DC power control is received over the second connector from the second device and provided over the first connector to the first device.

* * * * *